United States Patent [19]
So et al.

[11] Patent Number: 4,741,616
[45] Date of Patent: May 3, 1988

[54] TEST INSTRUMENT FOR OPTICAL FIBER CONNECTORS
[75] Inventors: Vincent C. Y. So; Paul J. Vella, both of Edmonton, Canada
[73] Assignee: Northern Telecom Limited, Montreal, Canada
[21] Appl. No.: 882,861
[22] Filed: Jul. 7, 1986
[51] Int. Cl.$^4$ ............................................. G01N 21/88
[52] U.S. Cl. ................................................. 356/73.1
[58] Field of Search ....................................... 356/73.1
[56]     References Cited
        U.S. PATENT DOCUMENTS
    4,309,105  1/1982  Lebduska ........................... 356/73.1

FOREIGN PATENT DOCUMENTS
60-49239  3/1985  Japan .................................. 356/73.1

OTHER PUBLICATIONS
Wearden, "The Optical Time Domain Reflectometer" Int. Fiber Optics, vol. 2, #2, Mar. 1981, pp. 41-44.

Primary Examiner—Vincent P. McGraw
Attorney, Agent, or Firm—R. John Haley

[57]    ABSTRACT

Light reflected at an optical fiber connector is monitored to test the connector. Light entering an optical fiber via the connector under test is attenuated in the fiber to prevent undesired reflections.

8 Claims, 1 Drawing Sheet

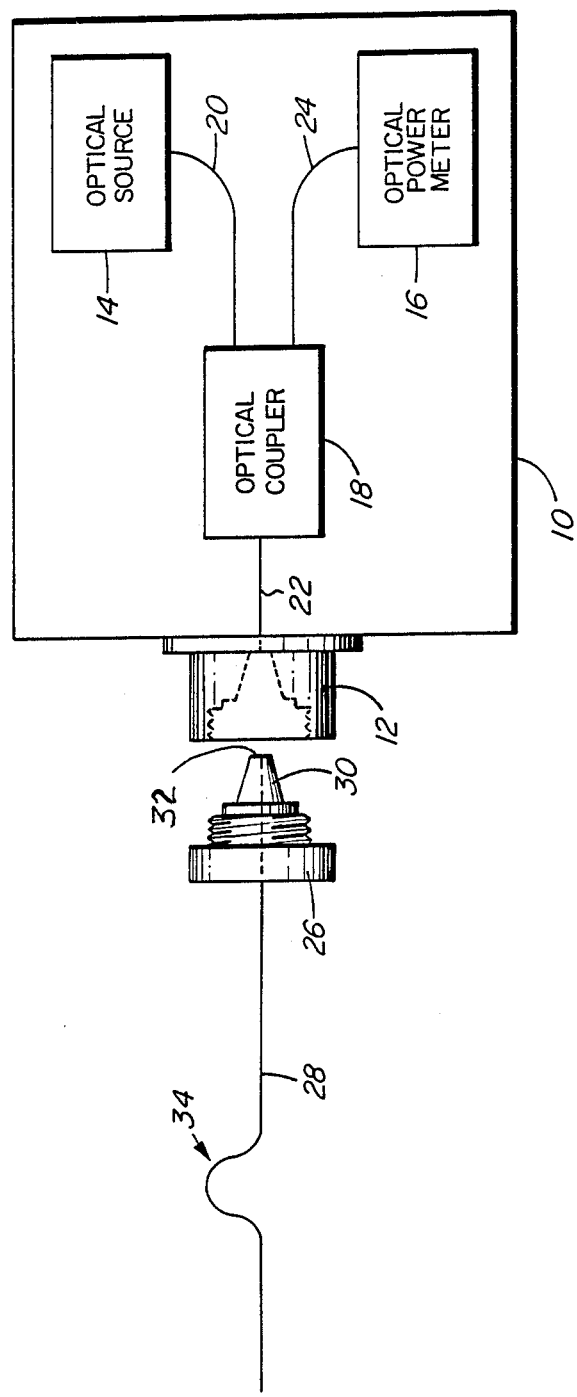

TEST INSTRUMENT FOR OPTICAL FIBER CONNECTORS

This invention relates to a test instrument for optical fiber connectors.

With increasing use of optical fibers for communications, a major concern has been the achievement of low-loss connections between fibers. Optical fiber connectors have been developed and substantially standardized which enable low-loss connections to be achieved, provided that the connectors themselves are not defective. In particular, an optical fiber must be positioned precisely within a tapered epoxy end portion of an optical fiber connector to achieve proper fiber alignment, and an end face of the fiber must be finely polished to avoid the presence of dirt or scratches which could adversely affect the performance of the counter.

Accordingly, a need exists for a test instrument for checking for defects in optical fiber connectors. To date, optical test instruments have been used for this purpose, such instruments basically comprising a microscope for inspecting the polished end of the fiber in the connector. Such instruments are expensive and introduce several disadvantages. In particular, it is very difficult or impossible for an operator to determine with such an instrument whether dirt or a scratch on the polished end of the fiber is on the core, where it would adversely affect the characteristics of the connector, or on the cladding, where it would have substantially no adverse effect, because the core is only of the order of 10 micrometers in diameter. Accordingly, connectors inspected using such instruments may be discarded as being dirty or scratched even though they may be perfectly acceptable in actual use. Furthermore, the test operation is subjective and requires a skilled operator.

An object of this invention, therefore, is to provide an improved test instrument for optical fiber connectors.

According to one aspect this invention provides a test instrument for testing optical fiber connectors, comprising: holding means for receiving an optical fiber connector to be tested and for supplying an optical signal thereto; source means for supplying an optical signal; continuously monitoring means for continuously monitoring an optical signal; and coupling means for coupling an optical signal supplied by the source means to the holding means and for coupling any reflected optical signal from the holding means to the monitoring means.

Preferably the monitoring means is responsive to the optical power of any reflected optical signal.

Thus in accordance with the invention the expensive, disadvantageous, and subjective use of an optical test instrument is replaced by a relatively simple test instrument which tests a connector by monitoring to what extent an optical signal is reflected therefrom. The connector is determined to be acceptable if relatively little light is reflected. The monitoring means can incorporate a threshold comparison and resultant indication of a good or bad connector, whereby the test instrument can easily be used by an unskilled operator.

The source means conveniently comprises a light-emitting diode, which can be provided at low cost. Thus even though the connector may ultimately be used with optical signals derived from a laser and having a different frequency, a low-cost optical source can be used for testing purposes because the characteristics of the connector are substantially independent of the optical signal frequency.

The accuracy of the test instrument is dependent upon light not being reflected back to the connector after it has reached the optical fiber. To avoid such reflection, the optical signal is desirably attenuated in the fiber, either as a result of the normal attenuation of an optical signal along the length of the fiber, or by bending the fiber so that the optical signal is attenuated at the bend.

Accordingly, this invention also provides a method of testing an optical fiber connector comprising the steps of: connecting the connector to an optical fiber connector holder; supplying an optical signal via the holder to the connector and thus to an optical fiber connected thereby; attenuating the optical signal in the optical fiber; and continuously monitoring any optical signal reflected by the connector.

The invention will be further understood from the following description with reference to the accompanying drawing, which schematically illustrates a test instrument and an optical fiber connector to be tested.

Referring to the drawing, a test instrument 10 comprises an optical fiber connector holder 12, an optical source 14 which is conveniently a light-emitting diode, an optical power meter 16 which may include a threshold comparator and good/bad indicators or other indicating means suitable for distinguishing between good and bad connectors, and an optical coupler 18 and optical fibers 20, 22, and 24 for coupling an optical signal from the source 14 to the holder 12 and for coupling any reflected optical signal from the holder 12 to the meter 16. The optical coupler 18 may be of any known form, or may be of the form described in U.S. patent application No. 856,887 filed Apr. 28, 1986 and entitled "Optical Signal Modulators".

An optical fiber connector 26 to be tested, connected to an optical fiber 28, includes a tapered epoxy end portion 30 through which the fiber 28 extends, as shown by a broken line, to a polished end face 32. The connector 26 is connectable in known manner to the holder 12 so that the fibers 28 and 22 are aligned with one another for coupling optical signals therebetween.

The holder 12 is selected to ensure that it is defect-free, and initially the test instrument is calibrated with an optical fiber connector which is known to be defect-free connected to the holder 12, thereby determining acceptable optical signal powers which may be registered by the meter 16, whereby a threshold level or other criterion for distinguishing between a good and bad connector is established.

In use, the connector 26 to be tested is connected to the holder 12, and the optical signal thereby supplied to the optical fiber 28 is attenuated therein, either by virtue of its own length and attenuation or, more desirably, by bending the fiber 28 with a small radius, as shown at 34 in the drawing. The optical power the end face 32 of the connector 26, and hence an indication of whether or not the connector is acceptable for use.

Numerous variations, modifications, and adaptations may be made to the particular embodiment of the invention described above without departing from the scope of the invention as defined in the claims.

What is claimed is:

1. A test instrument for testing optical fiber connectors, comprising:

holding means for receiving an optical fiber connector to be tested and for supplying an optical signal thereto;

source means for supplying an optical signal; continuously monitoring means for continuously monitoring an optical signal; and coupling means for coupling an optical signal supplied by the source means to the holding means and for coupling any reflected optical signal from the holding means to the monitoring means.

2. A test instrument as claimed in claim 1 wherein the monitoring means is responsive to the optical power of any reflected optical signal.

3. A test instrument as claimed in claim 1 wherein the source means comprises a light-emitting diode.

4. A test instrument as claimed in claim 2 wherein the source means comprises a light-emitting diode.

5. A method of testing an optical fiber connector comprising the steps of:

connecting the connector to an optical fiber connector holder;

supplying an optical signal via the holder to the connector and thus to an optical fiber connected thereby;

attenuating the optical signal in the optical fiber; and continuously monitoring any optical signal reflected by the connector.

6. A method as claimed in claim 5 wherein the monitoring step comprises monitoring the optical power of any reflected optical signal.

7. A method as claimed in claim 5 wherein the optical signal is attenuated in the optical fiber by bending the optical fiber.

8. A method as claimed in claim 6 wherein the optical signal is attenuated in the optical fiber by bending the optical fiber.

* * * * *